United States Patent
Lee

(10) Patent No.: US 7,185,166 B2
(45) Date of Patent: Feb. 27, 2007

(54) COMPUTER SYSTEM AND METHOD FOR DETERMINING OPERATION IN A MULTI-CHANNEL MODE

(75) Inventor: Cheol-Ho Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 354 days.

(21) Appl. No.: 10/614,817

(22) Filed: Jul. 9, 2003

(65) Prior Publication Data

US 2004/0117581 A1 Jun. 17, 2004

(30) Foreign Application Priority Data

Dec. 13, 2002 (KR) .................. 10-2002-0079661

(51) Int. Cl.
 *G06F 12/00* (2006.01)
(52) U.S. Cl. ............................. 711/172; 713/2
(58) Field of Classification Search ............... None
 See application file for complete search history.

(56) References Cited

U.S. PATENT DOCUMENTS

| | | | |
|---|---|---|---|
| 5,862,320 A | | 1/1999 | Nelsen et al. |
| 6,003,121 A | * | 12/1999 | Wirt ............................ 711/170 |
| 6,047,343 A | | 4/2000 | Olarig |
| 6,496,945 B2 | * | 12/2002 | Cepulis et al. ................ 714/25 |
| 6,535,420 B1 | * | 3/2003 | Kawamata ............. 365/185.04 |
| 6,636,957 B2 | * | 10/2003 | Stevens et al. ............. 711/171 |
| 6,845,277 B1 | * | 1/2005 | Michelet et al. .............. 700/83 |
| 2002/0059556 A1 | | 5/2002 | Brawn |
| 2002/0188818 A1 | | 12/2002 | Kazuaki et al. |

FOREIGN PATENT DOCUMENTS

| | | |
|---|---|---|
| GB | 2 342 471 | 4/2000 |
| JP | 2001-14222 | 1/2001 |
| JP | 2001-167001 | 6/2001 |
| JP | 2002-7200 | 1/2002 |
| KR | 2000-53380 | 8/2000 |
| KR | 10-330531 | 3/2002 |
| KR | 10-335504 | 4/2002 |
| KR | 2002-27184 | 4/2002 |
| KR | 10-358628 | 10/2002 |

OTHER PUBLICATIONS

European Search Report for Application 03257379.2; mailed Mar. 17, 2006.

* cited by examiner

*Primary Examiner*—Brian R. Peugh
*Assistant Examiner*—Craig E Walter
(74) *Attorney, Agent, or Firm*—Staas & Halsey LLP

(57) ABSTRACT

A method of controlling a computer having a plurality of memory buses adapted to be operated in a multi-channel mode by reading memory information of at, least one of a plurality of memory modules connected to the respective memory buses and displaying whether the plurality of the memory buses can operate and/or are operating in the multi-channel mode by comparing the read memory information. Thus, a user can confirm whether a plurality of memory buses operate in a multi-channel mode.

20 Claims, 4 Drawing Sheets

FIG. 4

- Present arrangement of the memory module
  - Sokect 1-64MB
  - Sokect 2-64MB
  - Sokect 3-128MB
  - Sokect 4-128MB

- In order to take advantage of a dual channel mode, arrange the memory module in the following configuration.
  - Sokect 1-64MB
  - Sokect 2-128MB
  - Sokect 3-64MB
  - Sokect 4-128MB

COMPUTER SYSTEM AND METHOD FOR DETERMINING OPERATION IN A MULTI-CHANNEL MODE

CROSS-REFERENCE TO RELATED APPLICATIONS

This application claims the benefit of Korean Patent Application No. 2002-79661, filed Dec. 13, 2002, in the Korean Intellectual Property Office, the disclosure of which is incorporated herein by reference.

BACKGROUND OF THE INVENTION

1. Field of the Invention

The present invention relates to a computer system and a control method thereof, more particularly to a computer system capable of confirming if a plurality of memory buses are operated in a multi-channel mode and a control method thereof.

2. Description of the Related Art

A computer memory has two basic types. One is a random access memory (RAM) and the other is a read only memory (ROM). The RAM is generally used for reading and writing data by a processor. The RAM is a typical volatile memory, that is, data stored therein is lost if power is cut off. The ROM is generally used for storing non-changeable data, such as a basic input/output system (BIOS). The ROM is a typical non-volatile memory, that is, data stored therein is not lost even if power is cut off.

In particular, the RAM is considered a dynamic RAM (DRAM) type, because it needs frequent recharging or refreshing to preserve/maintain content therein. A plurality of RAMs arranged on a small circuit card are referred to as a "memory module". A currently widespread module type DRAM has a plug that is inserted into a memory socket connected to a main board or a memory carrier card in a computing device. Some examples of current memory modules are: a fast page mode (FPM) module, an extended data out (EDO) module, a synchronous DRAM (SDRAM) module, a Rambus DRAM (RDRAM) module, a double data rate SDRAM (DDR SDRAM) module, and so on.

In the case of using two or more memory modules, a dual channel mode memory module configuration that theoretically shows a twofold efficiency for same memory capacity as a single channel mode memory module configuration has been adopted to improve efficiency when using two or more memory modules. In the dual channel mode, respective memory modules are separated into two channels and used in parallel, advantageously accomplishing a twofold memory bandwidth using the currently available memory modules.

Operation in the dual channel mode is based on the assumption that memory modules connected to both channels are mutually compatible. Therefore, in case critical features between the memory modules connected to each channel are different, the dual channel mode cannot be performed. For example, memory modules of manufacturers have features, such as various device structures and logical banks according to manufacturer thereof or kinds of memories, which differ from each other, and cannot work in the dual channel mode if they are connected to each channel. Also, in the case that memory capacities of respective channels are different, for example, a memory capacity of a first channel is 128 MB while a memory capacity of a second channel is 64 MB, the dual channel mode cannot be performed.

Further, a computer operating in the conventional dual channel mode, does not have a method of confirming whether the memory system is operating in the dual channel mode. Thus, although a computer operates in the dual channel mode, there is a problem that operation efficiency is decreased, in case the memory modules are not correctly arranged.

SUMMARY OF THE INVENTION

Accordingly, the present invention provides a computer confirming whether a plurality of memory buses operate in a multi-channel mode and a control method thereof.

Additional aspects and advantages of the invention will be set forth in part in the description which follows and, in part, will be obvious form the description, or may be learned by practice of the invention.

The present invention may be achieved by a method of controlling a computer having a plurality of memory buses adapted to be operated in a multi-channel mode, comprising reading memory information of at least one of a plurality of memory modules connected to the respective memory buses and displaying whether the plurality of the memory buses operate in the multi-channel mode by comparing the read memory information to one another.

According to an aspect of the present invention, the read memory information includes SPD data stored in the respective memory modules.

According to an aspect of the present invention, the SPD data comprises memory capacity information of the respective memory modules.

According to an aspect of the present invention, the method further comprises examining an existence of an arrangement of the memory modules connected to the plurality of the memory buses that allows the plurality of the memory buses to operate in the multi-channel mode, when determined that the plurality of the memory buses do not operate in the multi-channel mode.

According to an aspect of the present invention, displaying whether the plurality of the memory buses operate in the multi-channel mode further comprises displaying the arrangement of the memory modules allowing the plurality of the memory buses to operate in the multi-channel mode, when there exists an arrangement of the memory modules connected to the plurality of the memory buses allowing the plurality of the memory buses to operate in the multi-channel mode.

The present invention may be also achieved by a computer having a plurality of memory buses adapted to be operated in a multi-channel mode, comprising a controller determining whether the plurality of the memory buses operate in the multi-channel mode by comparing memory information of at least one of a plurality of memory modules, connected to the respective memory buses, to one another and a display displaying whether the plurality of the memory buses operate in the multi-channel mode according to the determination by the controller.

According to an aspect of the present invention, the memory information of the memory modules connected to the respective memory buses includes SPD data stored in the respective memory modules.

According to an aspect of the present invention, the SPD data comprises memory capacity information of the respective memory modules.

According to an aspect of the present invention, the controller examines an existence of an arrangement of the memory modules connected to the plurality of the memory buses that allows the plurality of the memory buses to operate in the multi-channel mode, when determined that the plurality of the memory buses do not operate in the multi-channel mode.

According to an aspect of the present invention, the display displays the arrangement of the memory modules allowing the plurality of the memory buses to operate in the multi-channel mode, when there exists an arrangement of the memory modules connected to the plurality of the memory buses allowing the plurality of the memory buses to operate in the multi-channel mode.

According to an aspect of the present invention, the controller comprises a determining program determining whether the plurality of the memory buses operate in the multi-channel mode.

According to an aspect of the present invention, the determining program is stored in a BIOS ROM.

According to an aspect of the present invention, the display comprises a monitor to display a picture.

BRIEF DESCRIPTION OF THE DRAWINGS

These and/or other aspects and advantages of the present invention will become apparent and more readily appreciated from the following description of the embodiments, taken in conjunction with the accompany drawings of which:

FIG. 4 is a display screen diagram showing arrangement information of memory modules operating in a multi-channel mode displayed on a monitor, according to an embodiment of the present invention.

DETAILED DESCRIPTION OF THE PREFERRED EMBODIMENTS

Figure 1:
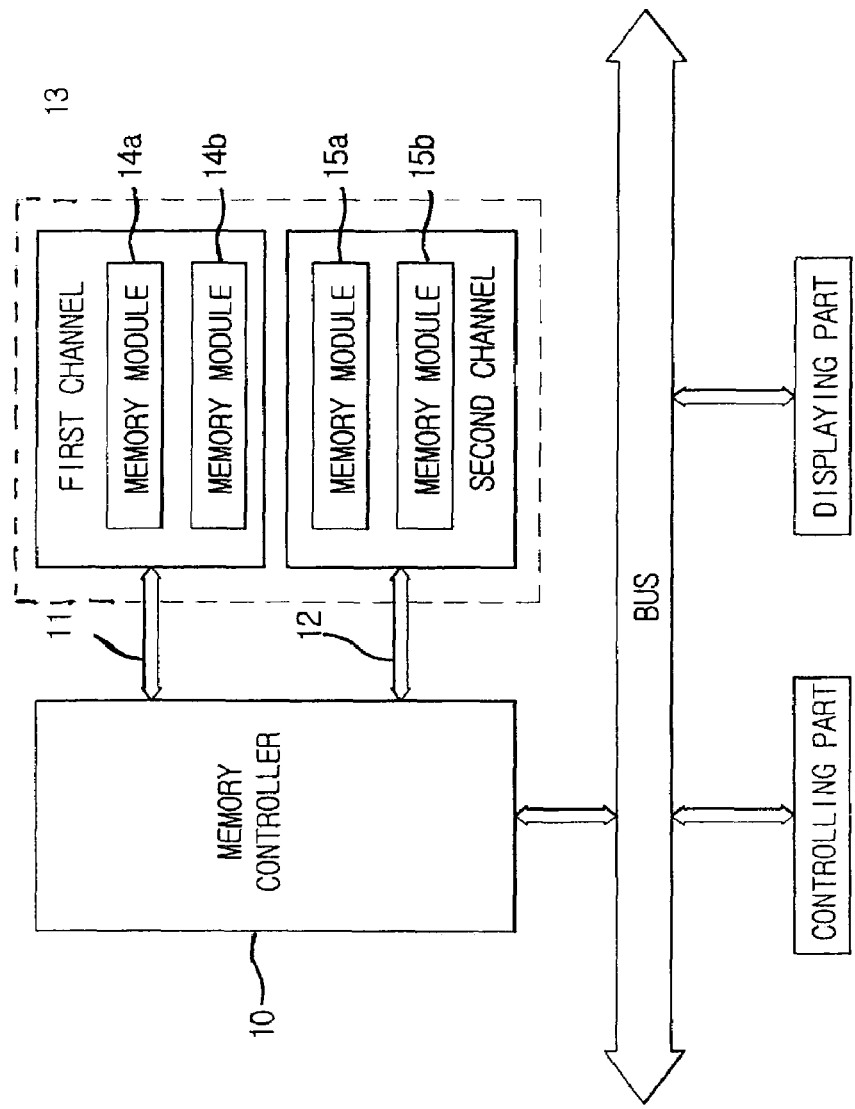
FIG. 1 is a control block diagram of a computer according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Conventionally, a computer comprises a CPU, a memory part, an output part and an input part. The output part comprises a video controller controlling a display output to a display apparatus /monitor, and a sound controller controlling audio output to a speaker. The input part comprises an input/output controller, an IDE controller, and a FDD controller, controlling a; keyboard, a mouse, a hard disk drive, a CDROM drive and a floppy disk drive, respectively. Herein, these structural parts (computer system apparatuses/ devices) are mutually connected to one another through a bus, such as a system bus, a PCI bus and a memory bus.

The memory part comprises a main memory, a BIOS ROM and a CMOS RAM. The BIOS ROM is a non-volatile memory storing BIOS data concerning the computer. The BIOS, which is a built-in software controlling and testing computer system apparatuses, performs a POST (Power On Self Test) to confirm whether the computer system apparatuses operate normally when power is supplied to the computer. On the other hand, the CMOS RAM stores computer system structure data. The BIOS initializes and tests each system apparatus during the POST by comparing system structure data obtained from the POST with the system structure data stored in the CMOS RAM.

The main memory comprises a random access memory (RAM). Conventionally, several RAMs are arranged on a small circuit card as a module type memory and each circuit card is referred to as "a memory module." The memory module circuit card has a plug that inserts into a memory socket connected to a main board or a memory carrier card of the computer system. The memory socket is connected to the memory bus, to thereby allow the memory module to be connected to the memory bus. The RAM arranged on the memory module can be a SDRAM (Synchronous DRAM), a Rambus DRAM, a DDR SDRAM (Double Date Rate SDRAM) or the like.

The computer according to an embodiment of the present invention, as shown in FIG. 1, comprises a plurality of memory buses 11 and 12 operated in a multi-channel mode. A controlling part (controller) 20 determines whether the plurality of the memory buses 11 and 12 can be operated in the multi-channel mode by comparing memory information of at least one of a plurality of memory module 14a, 14b, 15a and 15b connected to respective (i.e., each) memory buses 11 and 12 to one another. A displaying part 5 comprising a monitor 5a and a graphic controller 5b, displays whether the plurality of the memory buses 11 and 12 operate in the multi-channel mode. Herein, the multi-channel mode, which is a concept in contrast to a single channel mode, has been developed for the following reason. The memory modules 14a, 14b, 15a and 15b are separated into a plurality of channels and used in parallel, thereby providing, for example, a dual channel mode memory bus operation, so that an increased memory bandwidth can be accomplished using the RAMs arranged on the memory modules. Herein, in FIG. 1, the two memory buses 11 and 12 comprising a first channel memory bus 11 and a second channel memory bus 12 and adapted to be operated in a dual channel mode are illustrated by way of an example, and a larger number of channel memory buses and corresponding memory modules may be configured as a multi-channel RAM. Hereinafter, a memory system operated in the dual channel mode will be described.

At least one of the memory modules 14a, 14b, 15a and 15b can be respectively connected to the first channel memory bus 11 and the second channel memory bus 12. The first channel memory bus 11 and the second channel memory bus 12 are extended from a memory controller 10 in parallel. The memory controller 10 controls the first channel memory bus 11 and the second channel memory bus 12 according to known multi-channel memory mode techniques. Accordingly, in this case, the controller 10 controls the first channel memory bus 11 and the second channel memory bus 12 to operate according to a dual-channel mode. Hereinafter, the memory modules 14a and 14b connected to the first channel memory bus 11 are referred to as a "first channel memory module," and the memory modules 15a and 15b connected to the second channel memory bus 12 are referred to as a "second channel memory module."

Memory information of the first channel memory modules 14a and 14b, and the second channel memory modules 15a and 15b comprise SPD (Serial Presence Detect) data stored in each memory module 14a, 14b, 15a and 15b. The SPD data comprises information, such as a device structure of the memory modules 14a, 14b, 15a and 15b, a logic bank, an access speed, and a refresh time, stored in a non-volatile memory, such as an EEPROM provided in each memory module 14a, 14b, 15a and 15b. The memory controller 10 appropriately controls access to each memory module 14a, 14b, 15a and 15b by using the SPD data.

In case the controlling part 20 determines that the first channel memory bus 11 and the second channel memory bus 12 do not/cannot operate in the dual channel mode, the controlling part 20 transmits this determined information to the displaying part 5. Thus, the displaying part 5 displays that the first channel memory bus 11 and the second channel memory bus 12 are not operated in the dual channel mode. In the case the controlling part 20 determines that the first channel memory bus 11 and the second channel memory bus 12 operate in the dual channel mode, the controlling part 20 transmits this determined information to the displaying part 5. Accordingly, the displaying part 5 can display that the first channel memory bus 11 and the second channel memory bus 12 operate in the dual channel mode.

In the case the controlling part 20 determines that the first channel memory bus 11 and the second channel memory bus 12 are not operated in the dual channel mode, the controlling part 20 examines an existence of an arrangement of memory modules in which the first channel memory bus 11 and the second channel memory bus 12 can operate in the dual channel mode. In the case there exists an arrangement of the memory modules enabling operation in the dual channel mode by the first channel memory modules 14a and 14b and the second channel memory modules 15a and 15b, the controlling part 20 transmits such memory module arrangement information regarding the dual channel mode operation to the displaying part 5. Accordingly the displaying part 5 displays memory module arrangement information enabling a dual channel mode. In the case an arrangement of the memory modules, enabling a dual channel mode, does not exist, the displaying part 5 can display that the first channel memory bus 11 and the second channel memory bus 12 do not/cannot operate in the dual channel mode and that a memory module arrangement enabling the dual channel mode does not exist. Thus, a user can obtain memory module arrangement information enabling a dual channel mode by the first channel memory modules 14a and 14b and the second channel memory modules 15a and 15b connected to the first channel memory bus 11 and the second channel memory bus 12.

Figure 2:
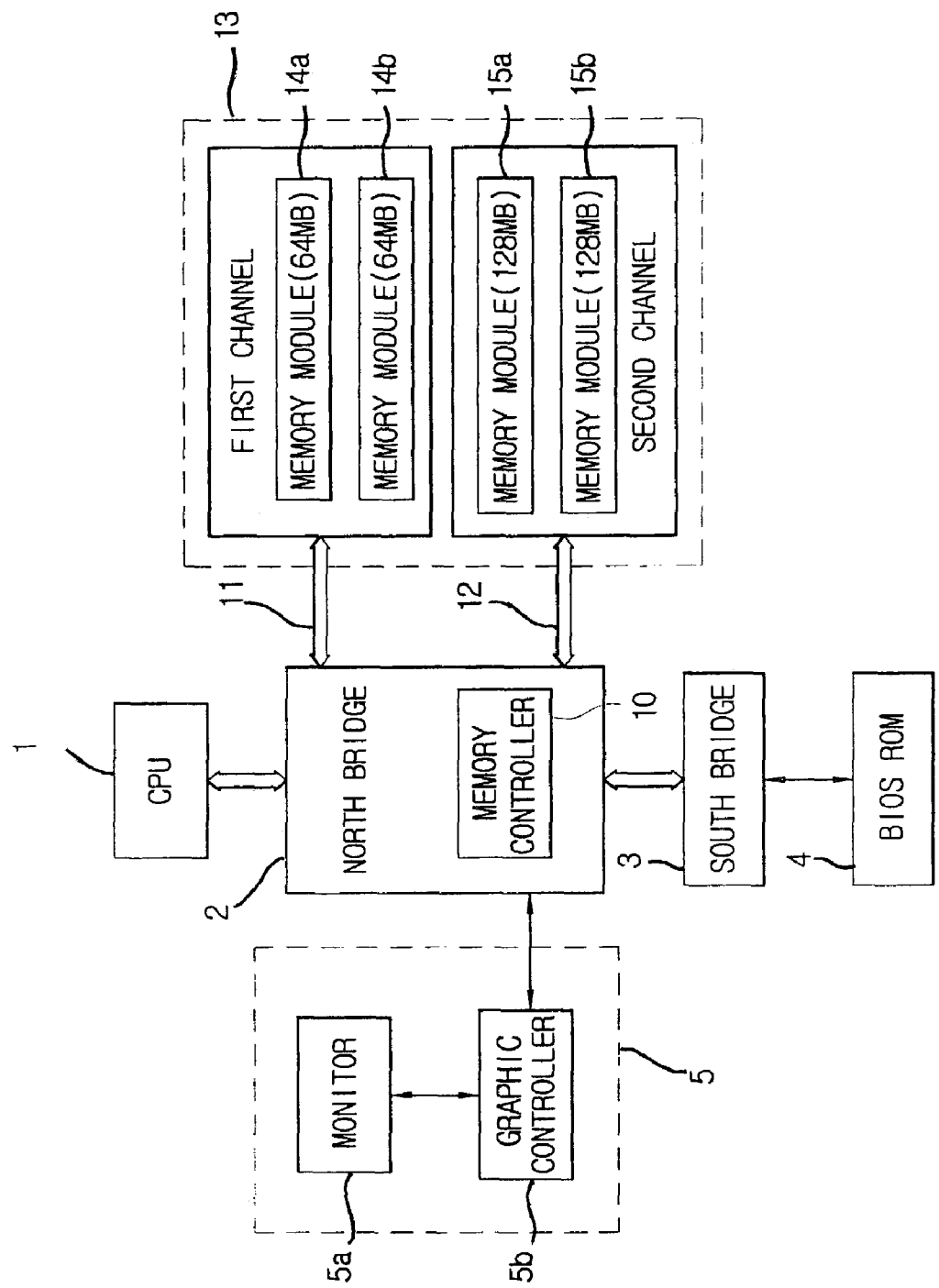
FIG. 2 is a more detailed control block diagram of the computer shown in FIG. 1.

FIG. 2 is a more detailed control block diagram of the computer shown in FIG. 1. As shown in FIG. 2, the computer according to an embodiment of the present invention comprises a CPU 1, a main memory 13, a BIOS ROM 4 storing a BIOS, a North Bridge 2 and a South Bridge 3. The North Bridge 2, which is a chipset controlling data transmission among the CPU 1, the main memory 13, and a graphic controller 5b, comprises the memory controller 10 controlling the main memory 13. The South Bridge 3 is a chipset controlling other devices not controlled by the North Bridge 2. Generally, the South Bridge 3 controls a keyboard/mouse controller (not shown), a USB port (not shown) and a PCI bus (not shown) and transmits a booting order received through the North Bridge 2 from the CPU 1 to the BIOS ROM 4.

The main memory 13 comprises a RAM (Random Access Memory), which is a volatile memory. The RAM is provided as a module type memory and is connected to the first channel memory bus 11 and the second channel memory bus 12 through corresponding memory sockets. Each RAM arranged on the memory modules 14a, 14b, 15a and 15b can be a SDRAM (synchronous DRAM), a Rambus DRAM and a DDR SDRAM (double data rate SDRAM).

The first channel memory bus 11 and the second channel memory bus 12 are connected to the memory controller 10 in parallel. The memory controller 10 controls the first channel memory modules 14a and 14b connected to the first channel memory bus 11 and the second channel memory modules 15a and 15b connected to the second channel memory bus 12 so that both the first and second channel memory modules (i.e., both channel memory buses) operate in a dual channel mode. Herein, for describing the present invention in more detail, for example, two memory modules 14a and 14b respectively having a 64 MB capacity are connected to the first channel memory bus 11 and two memory modules 15a and 15b respectively having a 128 MB capacity are connected to the second channel memory bus 12. Also, it is assumed that features of each memory module 14a, 14b, 15a and 15b are the same except for the memory capacity.

The BIOS ROM 4 stores the BIOS, which is a program used for changing configurations of the computer system. Herein, the BIOS comprises a determining program determining whether the first channel memory bus 11 and the second channel memory bus 12 can operate and/or are operating in the dual channel mode (i.e., a multi-channel memory mode determiner). Typically, when the BIOS performs a POST to confirm whether the computer system apparatuses operate normally, the determining program operates during the POST to determine whether the first channel memory bus 11 and the second channel memory bus 12 operate in the dual channel mode.

A monitor 5a of the displaying part 5 displays whether the first channel memory bus 11 and the second channel memory bus 12 are operated in the dual channel mode based upon a dual channel mode status (i.e., multi-channel memory mode information) from the determining program. In particular, information of whether the first and second memory modules operate in a dual channel mode as determined by the determining program is transmitted to the graphic controller 5b through the North Bridge 2. The graphic controller 5b controls the monitor 5a to display the received multi-channel memory mode information.

Figure 3:
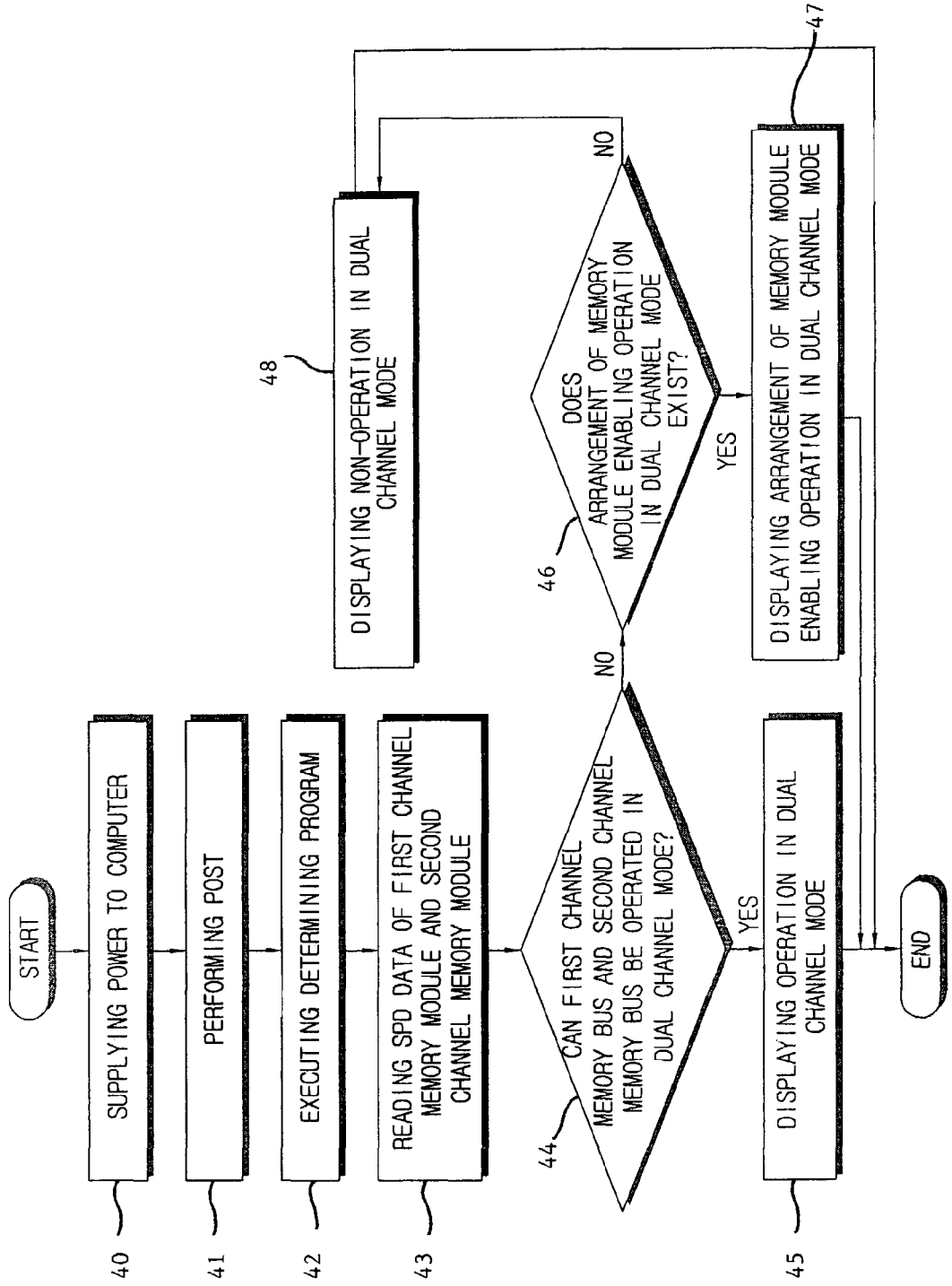
FIG. 3 is a control flow diagram of controlling the computer shown in FIG. 1, according to an embodiment of the present invention.

FIG. 3 is a flow chart of a method of controlling the computer shown in FIG. 1, according to an embodiment of the present invention, which will be described as follows with reference to FIGS. 2 through 4. In FIG. 3, at operation 40, if power is supplied to the computer, a signal is generated from a chip (not shown) controlling system reset, so that all circuits including the CPU 1 are reset. The reset CPU 1 transmits a predetermined booting order to the BIOS through the North Bridge 2 and the South Bridge 3 so as to execute the BIOS stored in the BIOS ROM 4. In particular, at operation 41, the BIOS is executed by the booting order of the CPU 1 to perform the POST. Generally, the CPU 1 reads BIOS data, stores the read BIOS data in the main memory 13 and performs the BIOS, for fast processing.

During the POST, at operation 42, the CPU 1 executes a determining program (i.e., a channel memory mode determiner) stored in the BIOS ROM 4. In particular, typically, the CPU 1 executes the determining program by transmitting a predetermined order signal to the BIOS ROM 4 through the North Bridge 2 and the South Bridge 3. Herein, typically, the CPU 1 reads the determining program, stores the read determining program in the main memory 13 and performs (executes) the determining program, to thereby increase processing speed.

At operation 43, typically, the South Bridge 3 reads SPD data of the first channel memory modules 14a and 14b and the second channel memory modules 15a and 15b, and transmits the SPD data to the CPU 1. Subsequently, at operation 44, the determining program determines whether the first channel memory bus 11 and the second channel memory bus 12 operate in a dual channel mode by comparing the SPD data of the first channel memory modules 14a and 14b with the SPD data of the second channel memory modules 15a and 15b transmitted to the CPU 1. Herein, for example, the determining program recognizes the difference between memory capacities of the first channel memory modules 14a and 14b (e.g., 64 MB) and the second channel memory modules 15a and 15b (e.g., 128 MB), and, thus, determines that the first channel memory bus 11 and the second channel memory bus 12 do not/cannot operate in the dual channel mode.

If, at operation 44, the determining program determines that the first channel memory bus 11 and the second channel memory bus 12 operate in the dual channel mode, at operation 45, the monitor 5a of the displaying part 5 displays that the first channel memory bus 11 and the second channel memory bus 12 operate in the dual channel mode. If, at operation 44, the determining program determines that the first channel memory bus 11 and the second channel memory bus 12 do not operate in the dual channel mode, at operation 46, the determining program examines an existence of an arrangement of the first and second memory modules allowing the first channel memory bus 11 and the second channel memory bus 12 to operate in the dual channel mode. In particular, for example, at operation 46, the determining program determines that an arrangement in which the memory modules each have a 64 MB and a 128 MB memory capacity connected to the first channel memory bus 11, and in which the memory modules each have a 64 MB and a 128 MB memory capacity separately connected to the second channel memory bus 12 (i.e., same memory capacity memory (RAM) modules are separately connected to first and second channel memory buses 11 and 12, respectively, via corresponding respective channel memory bus memory modules 14a and 15a (sockets 1 and 3) and memory modules 14b and 15b (sockets 2 and 4)), is a memory module arrangement enabling the dual channel mode memory bus operation.

If, at operation, 46, there exists a dual channel mode memory module arrangement, at operation 47, the graphic controller 5b controls the monitor 5a to display the memory module arrangement information enabling the dual channel mode, which is transmitted through the North Bridge 2 to the displaying part 5. If, at operation 46, an arrangement of the memory modules enabling the dual channel mode does not exist, at operation 48, the. graphic controller 5b is controlled to control the monitor 5a to display that the first channel memory bus 11 and the second channel memory bus 12 do not/cannot operate in the dual channel mode, or that an arrangement of the memory modules enabling the dual channel mode does not exist.

FIG. 4 is a display screen diagram showing arrangement information of the memory modules enabling the dual channel mode, which, at operation 47, is displayed on the monitor 5a, by way of an example. The memory module arrangement information enabling the dual channel mode can be displayed in various forms, such as pictures as well as characters, to see the arrangement of the memory modules enabling the dual channel mode.

Although in the above-described embodiment, the controlling part 20 is operated by (i.e., embodied in/implemented as) the determining program (software) stored in the BIOS ROM 4 and a multi-channel mode, such as a dual channel mode, a memory status is determined during the POST, the present invention is not limited to such configuration, and the controlling part 20, which typically is based on an operating system (OS), can be, for example, provided as an application stored in a hard disk drive, so that the controlling part 20 can be executed by a user after booting of the computer.

Also, although in the above-described embodiment, the displaying part 5 comprises the monitor 5a, the present invention is not limited to such configuration, and any information output apparatus (i.e., a multi-channel memory mode output unit), such as a dedicated LED (Light-Emitting Diode), to inform a user as to whether memory buses are operated in the dual channel mode can be provided. Further, an emitting color of an existing LED can be varied according to whether memory buses are operated in the dual channel mode.

Further, in the above-described embodiment, the first channel memory bus 11 and the second channel memory bus 12 adapted to be operated in the dual channel mode is described by way of an example, but if 3 or more memory buses controlled by a memory controller are provided, so that the memory buses operate in a multi-channel mode, the controlling part 20 determines whether the 3 or more memory buses can be operated in the multi-channel mode and display multi-channel memory mode information according to the determination via the displaying part 5.

According to the present invention, memory information of a plurality of channeled memory modules is compared with one another to determine whether a plurality of memory buses connected to the respective channeled memory modules operate according to a multi-channel mode, and to inform a user as to whether the main memory 13 can be operated in the multi-channel mode. The compared memory information may be, for example, manufacturer information, device structure and logical bank information, type information, capacity information, or etc. Further, if the plurality of the memory buses do not operate in the multi-channel mode, a memory module arrangement is searched for in which the plurality of the memory buses operate in the multi-channel mode (i.e., a channeled memory module arrangement that allows a multi-channel mode memory bus operation). Further, a user is informed of multi-channel memory mode information, for example, as to whether the memory buses can operate in the multi-channel mode and/or whether there exists a memory module arrangement that allows a multi-channel mode memory bus operation, thereby allowing the user, for example, to rearrange the memory modules.

As described above, the present invention provides a computer dynamically confirming whether a plurality of memory buses operate in a multi-channel mode, and a control method thereof. Also, if the plurality of the memory buses do not operate in the multi-channel mode, the present invention provides a computer confirming an existence of an arrangement of memory modules enabling the multi-channel mode, and a control method thereof. The processes of the invention embodied in the controlling part 20 of the computer shown in FIG. 1 can be implemented in software, for example, as the multi-channel memory mode determiner (the determining program) provided in the BIOS, and/or in computing hardware. For example, a computing device according to the invention comprises computer readable data storage, such as magnetic and optical discs, RAM, ROM, etc., on which the processes of the invention can be stored as software and executed to control the computing device according to the invention.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling a computer having a plurality of memory buses operating according to a multi-channel mode, comprising:
   reading memory information of at least two memory modules selected from a plurality of memory modules connected to the respective memory buses; and
   displaying whether the plurality of the memory buses operate in the multi-channel mode by comparing the read memory information of a first memory module of a first channel to the read memory information of at least a second memory module of at least a second channel to make a determination as to whether characteristics of the first memory module of the first channel are compatible with characteristics of at least one of the memory modules of the second channel such that the memory buses can operate in the multi-channel mode.

2. The method of claim 1, wherein the read memory information comprises serial presence detect (SPD) data stored in the respective memory modules.

3. The method of claim 2, wherein the SPD data comprises memory capacity information of the respective memory modules.

4. The method of claim 1, further comprising examining an existence of an arrangement of the memory modules connected to the plurality of the memory buses that allows the plurality of the memory buses to operate in the multi-channel mode, when the comparing determines that the plurality of the memory buses do not operate in the multi-channel mode.

5. The method of claim 4, wherein the displaying whether the plurality of the memory buses operate in the multi-channel mode further comprises displaying the arrangement of the memory modules allowing the plurality of the memory buses to operate in the multi-channel mode.

6. A computer having a plurality of memory buses operating in a multi-channel mode, comprising:
   a controller determining whether the plurality of the memory buses operate in the multi-channel mode by comparing memory information of at least one of a plurality of memory modules of a first channel to at least one of a plurality of memory modules of at least a second channel, the memory modules being connected to the respective memory buses, to make a determination as to whether characteristics of at least one of the memory modules of the first channel are compatible with characteristics of at least one of the memory modules of the second channel such that the memory buses can operate in the multi-channel mode; and
   an output unit providing information about whether the plurality of memory buses operate in the multi-channel mode according to the determination by the controller.

7. The computer according to claim 6, wherein the memory information of the memory modules connected to the respective memory buses comprises serial presence detect (SPD) data stored in the respective memory modules.

8. The computer according to claim 7, wherein the SPD data comprises memory capacity information of the respective memory modules.

9. The computer according to 6, wherein the controller examines an existence of an arrangement of the memory modules connected to the plurality of the memory buses that allows the plurality of the memory buses to operate in the multi-channel mode, when the controller determines that the plurality of the memory buses do not operate in the multi-channel mode.

10. The computer according to claim 9, wherein the output unit visually informs the arrangement of the memory modules allowing the plurality of the memory buses to operate in the multi-channel mode.

11. The computer according to claim 10, wherein the controller is a determining program determining whether the plurality of the memory buses operate in the multi-channel mode.

12. The computer according to claim 11, wherein the determining program is stored in a BIOS ROM.

13. The computer according to claim 10, wherein the output unit comprises a monitor to display information about the arrangement.

14. A computer readable storage controlling a computer according to a stored process of:
   reading memory information of at least one of a plurality of channeled memory modules of a first channel and at least one of a plurality of memory modules of at least a second channel, the memory modules being connected to respective memory buses;
   comparing the read memory information of at least one of the memory modules of the first channel to the read memory information of at least one of the memory modules of at least the second channel to make a determination as to whether characteristics of at least one of the memory modules of the first channel are compatible with characteristics of at least one of the memory modules of the second channel such that the memory buses can operate in the multi-channel mode; and
   outputting multi-channel mode information about whether the plurality of memory buses operate in the multi-channel mode based upon the comparing.

15. The computer readable storage of claim 14, wherein the memory information comprises manufacturer information, device structure and logical bank information, type information and capacity information.

16. The computer readable storage of claim 14, wherein the comparing comprises comparing memory capacities of the channeled memory modules of the first channel to at least one of the channeled memory modules of at least the second channel to determine if same memory capacity memory modules are separately connected to each memory bus, respectively.

17. The computer of claim 6, further comprising:
   a BIOS ROM performing a power on self test (POST) during booting of the computer, and
   wherein the controller is software stored in the BIOS ROM and determining the multi-channel mode memory bus operation during the POST.

18. The computer of claim 17, further comprising:
   a north bridge controlling the plurality of the memory modules, wherein the controller controls the north bridge to read the memory information during the POST.

19. A method, comprising:

outputting multi-channel mode memory bus information based upon memory information of channeled memory modules of a first channel and at least a second channel, the multi-channel mode memory bus information being determined by comparing at least one memory module of the first channel and at least one memory module of at least a second channel, the memory modules being connected to respective memory buses, to make a determination as to whether characteristics of at least one of the memory modules of the first channel are compatible with characteristics of at least one of the memory modules of the second channel such that the memory buses can operate in the multi-channel mode.

20. A method of determining a multi-channel mode memory bus operation of a computer having a plurality of memory buses connected to corresponding channeled memory modules, the method comprising:

executing a program to determine the multi-channel mode memory bus operation during a power on self test, the program controlling the computer according to a process of:

reading memory information of at least two memory modules selected from the channeled memory modules connected to the memory buses respectively;

comparing the read memory information of a first memory module of a first channel to the read information of at least a second memory module of at least a second channel to make a determination as to whether characteristics of the first memory module of the first channel are compatible with characteristics of at least one of the memory modules of the second channel such that the memory buses can operate in the multi-channel mode; and displaying whether the memory buses operate in the multi-channel mode according to the comparing of the read memory information; and displaying an arrangement of the memory modules allowing the multi-channel mode memory bus operation.

* * * * *

UNITED STATES PATENT AND TRADEMARK OFFICE
CERTIFICATE OF CORRECTION

| | | |
|---|---|---|
| PATENT NO. | : 7,185,166 B2 | Page 1 of 1 |
| APPLICATION NO. | : 10/614817 | |
| DATED | : February 27, 2007 | |
| INVENTOR(S) | : Cheol-ho Lee | |

It is certified that error appears in the above-identified patent and that said Letters Patent is hereby corrected as shown below:

Title Page, Column 2 (Abstract), Line 3, change "at," to --at--.

Column 10, Line 4, after "to" insert --claim--.

Signed and Sealed this

Twenty-sixth Day of June, 2007

JON W. DUDAS
*Director of the United States Patent and Trademark Office*